United States Patent [19]

Smith et al.

[11] Patent Number: 5,010,247

[45] Date of Patent: Apr. 23, 1991

[54] METHOD OF CLASSIFYING OBJECTS ACCORDING TO SHAPE

[75] Inventors: Martin P. Smith, Wargrave; Colin D. Saunders, Marlow, both of England

[73] Assignee: Spandrel Establishment, Vaduz, Liechtenstein

[21] Appl. No.: 418,265

[22] Filed: Oct. 6, 1989

[30] Foreign Application Priority Data

Oct. 7, 1988 [GB] United Kingdom ................. 8823570

[51] Int. Cl.[5] ........................... G01N 9/04; B07C 5/04

[52] U.S. Cl. ................................ 250/223 R; 250/560; 356/386; 209/586

[58] Field of Search ...................... 250/226, 222.2, 228, 250/221.1, 223 R, 560; 356/386, 379, 380, 236; 209/586, 587, 525, 576, 577

[56] References Cited

U.S. PATENT DOCUMENTS

| | | | |
|---|---|---|---|
| 3,549,008 | 12/1970 | Anderson | 209/82 |
| 3,708,065 | 1/1973 | Aull et al. | 209/73 |
| 3,774,040 | 11/1973 | Stephanos | 250/560 |
| 4,057,146 | 11/1977 | Castaneda et al. | 250/226 |
| 4,120,403 | 10/1978 | Stephanos | 209/586 |
| 4,132,314 | 1/1979 | von Beckmann et al. | 209/586 |
| 4,246,098 | 1/1981 | Conway et al. | 250/223 R |
| 4,645,922 | 2/1987 | Welbourn et al. | 250/226 |
| 4,663,522 | 5/1987 | Welbourn et al. | 250/223 R |
| 4,878,582 | 11/1989 | Codding | 250/226 |
| 4,915,827 | 4/1990 | Rosenthal | 209/577 |

FOREIGN PATENT DOCUMENTS

| | | |
|---|---|---|
| 0220832 | 5/1987 | European Pat. Off. . |
| 1209563 | 10/1970 | United Kingdom . |
| 1274449 | 5/1972 | United Kingdom . |
| 1493273 | 11/1977 | United Kingdom . |
| 1571889 | 7/1980 | United Kingdom . |
| 2142426 | 1/1985 | United Kingdom . |
| 87/01975 | 4/1987 | World Int. Prop. O. . |

*Primary Examiner*—David C. Nelms
*Assistant Examiner*—Michael Messinger
*Attorney, Agent, or Firm*—Kerkam, Stowell, Kondracki & Clarke

[57] ABSTRACT

Objects are dropped in succession through a viewing zone, where they are viewed in bright field illumination by three viewers along mutually orthogonal axes, using radiation of different wave-lengths (or viewing in rapid succession). The viewers sense the presented area. The presented areas are compared in a microprocessor in order to obtain a rough determination of the shape of the object. The presented areas can, for example, be summated to obtain a rough determination of the size of the object.

9 Claims, 1 Drawing Sheet

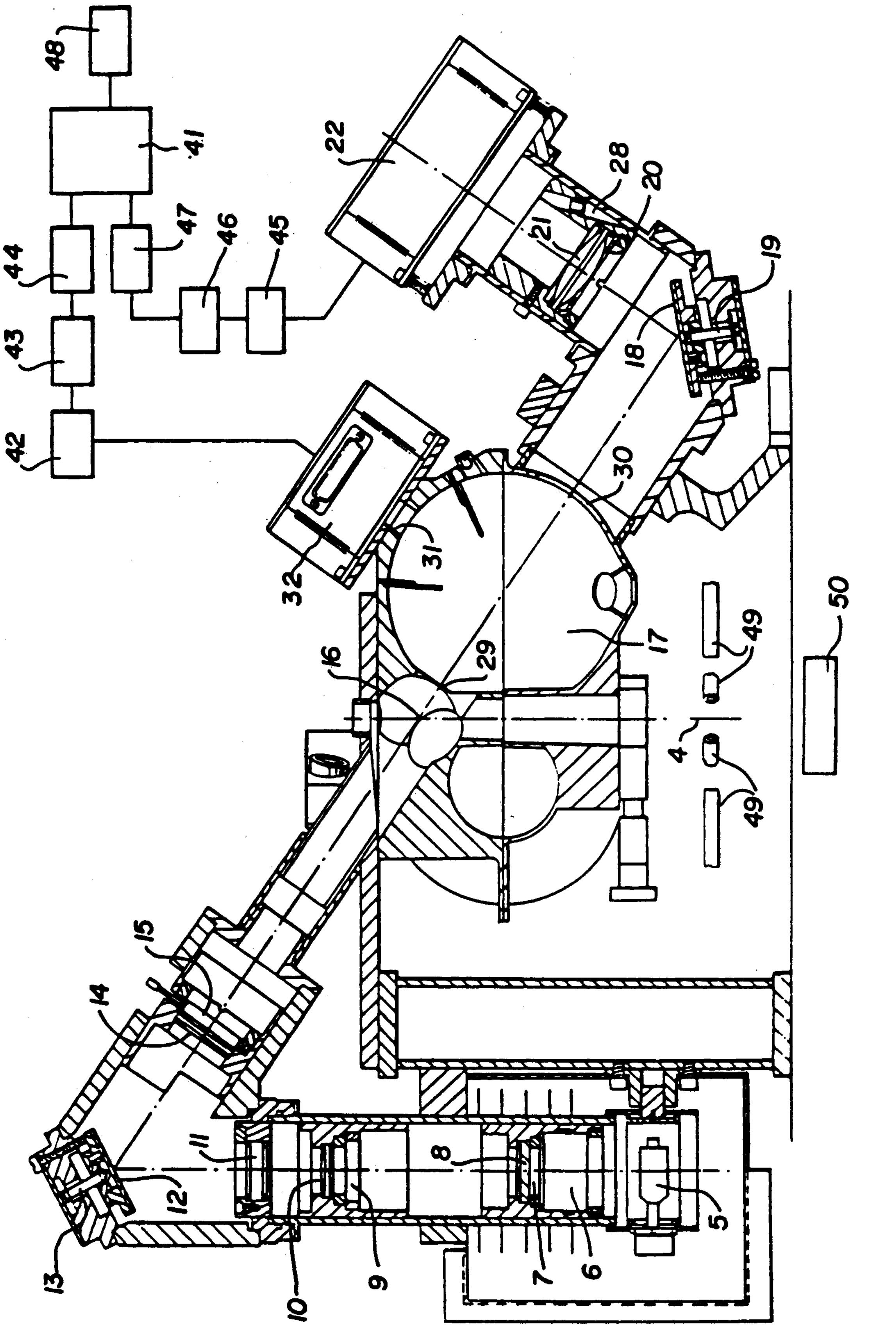
48
41
44
47
46
45
43
42
22
28
20
21
19
18
30
32
31
17
29
16
50
49
4
49
15
14
11
8
13
12
10
9
7
6
5

METHOD OF CLASSIFYING OBJECTS ACCORDING TO SHAPE

BACKGROUND OF THE INVENTION

EP-A-0 227 404 describes a way of sorting objects according to shape, which can provide an accurate sort. However, such accuracy is not always required, and it is desirable to be able to make a rough sort using less expensive equipment.

THE INVENTION

The present invention provides a method and apparatus in which objects to be classified are passed in succession through a viewing zone in which the presented area of each object is sensed with at least three viewers which view along at least three respective angularly-spaced axes, and presented area signals from each respective viewer are compared to make a rough determination of the shape of the object.

Fundamentally, it has been realised that the arrangement of GB-A-2 165 943 can be used for making a rough sort according to shape, employing only the part of the arrangement which senses the reduction in flux along the axis of projection, thereby detecting the presented area. The detector which senses the forward-scattered illumination is not employed.

The invention also provides a method and apparatus for making a rough determination of the size, by summing the signals from each viewer, or selecting the signal representing the largest or smallest presented area sensed.

It is desirable to substantially prevent cross-talk, which can be a significant source of inaccuracy. There would be optical cross-talk if the same wave-lengths were used simultaneously for detecting area in different directions, for instance due to reflection from the surfaces of the objects, and, if the objects are translucent or transparent, due to refraction within the objects. Cross-talk can be prevented by using different wave-lengths, or by viewing in rapid succession. The advantage of using different wave-lengths is that the object can be viewed simultaneously with each wave-length, avoiding inaccuracy due to say spinning of the object. However, it is possible to obtain reasonable accuracy by viewing the object along the respective axes in succession; the object must by viewed by the different viewers in sufficiently rapid succession so that its orientation has not changed grossly between views; the rapidity of succession will depend on the amount that the object is expected to be spinning or turning, but normally the views will be taken in as rapid succession as possible and nearly simultaneously.

Normally, the axes along which the object is viewed would substantially intersect at the position of the object when viewed. There are perferably three axes in mutually orthogonal arrangement.

Although this not need necessarily be so, it is preferred that the object be in free flight i.e. unconstrained motion under gravity (preferably falling vertically) when it is viewed; although the motion is unconstrained, when viewed the object is preferably projected by an accelerator to give greater throughput and a better defined time interval between successive objects (less time scatter).

DESCRIPTION OF THE DRAWING

The invention will be further described, by way of example, with reference to the accompanying drawing in which the single FIGURE is a vertical sectional view through the apparatus employed for classifying objects according to shape.

THE PREFERRED EMBODIMENT

The single drawing is a sectional view through the apparatus and shows a single light source and detector system although, as will be apparent hereinbelow, the apparatus employs three such sources and detectors for viewing objects to be classified. The three sources and detectors are arranged for viewing along the respective paths of three different, mutually orthogonal illuminating beams for classifying successive articles passing along an axis intersecting the three beams. Only the light source and detector system shown will be described with reference to the drawing, it being understood that the description applies equally to each of the sources and detector systems.

Referring specifically to the drawing, it is seen that there is a conventional bulb 5 having a rectangular filament, a condensor lens 6, an iris diaphragm 7 to provide coarse adjustment of the beam flux, a first filter 8, a square aperture 9, a lens 10, a second filter 11, a mirror 12 having a known kinematic steering system 13 for pivoting it about an axis normal to the drawing, a lens 14, an iris diaphragm 15 to provide fine adjustment of the beam flux, a position 16 where an object to be classified is viewed, an integrating cavity 17 generally in the form of a sphere, a mirror 18 having a known kinematic steering system 19 for pivoting it about an axis normal to the drawing, an iris diaphragm 20, a lens 21 and a detector unit 22 which acts as said second responsive means and may have for instance a large area silicon photo-diode provided with a filter, not shown. The integrating cavity 17 contains a small emitter 28 which fires at predetermined intervals to check that a particular channel is operative within the limits set. Integrating cavity 17 has circular inlet and outlet aperatures 29, 30.

In addition to use for classifying objects according to shape in accordance with the present invention, the apparatus may be employed to determine the light transmissivity of objects and to this end, the integrating cavity 17 has a further aperature 31 associated with another detector unit 32 which in association with the integrating cavity 17 acts as a first responsive means for producing a first signal responsive to the total flux of radiation transmitted through the object. The detector unit 32 can be similar to unit 22 but may have a different electronic gain to that of detector 22. For purposes of the present invention, the integrating cavity 17 and the second detector unit are not used, with the integrating cavity 17 acting merely as a housing through which the beam passes in its path to mirror 18.

The optical arrangement may be such that the beam is focused at position 16, providing at position 16 an image of the filament of the bulb 5 which may for instance be magnified X3. In general terms, it is not necessary for the beam to be focused at position 16—the beam could be in the form of parallel light at position 16 or diverging, with the size of the beam being such that it is wide enough to bathe all of the facing surface of the object being classified, but narrow enough for the whole beam to pass in the inlet aperature 29 and out the outlet aperature 30.

The signal given by the detector 22 is attenuated by the size of the object, i.e., is responsive to the reduction in flux when the object is in the beam. If it is assumed that virtually no light passes straight through the object, the reduction in flux is the measure of the projected cross-sectional area of the object.

Any suitable electronic arrangement can be used for the calculation. In the drawing, a micro-processor 41 is connected to the detector unit 22 by way of a pulse amplifier/inverter 45, a peak detector 46 and an analog/digital converter 47. The micro-processor, as shown, is also connected to detector unit 32 by way of a pulse amplifier 42, a peak detector 43 and an analog/-digital converter 44. Again, it is noted that unit 32 is not employed in pratice of the present invention and normally detector unit 32 and its associated equipment connecting it to the microprocessor would be turned off.

The microprocessor 41 can be used to drive a series of pneumatic solenoid valves 48 connected to a ring of nozzles 49 for blowing objects into one of a number of sort bins indicated schematically at 50.

In use of the apparatus thus described for the classification of objects according to shape in accordance with the present invention, the object is viewed in bright field illumination at the point 16. In order to avoid cross talk as discussed above, it is preferred to use different wave-length bands, rather than pulsing, and the near infra-red is preferred for objects such as diamonds, because of the reduction in signal absorption due to diamond colour, all appearing grey under infra-red; preferred band centres are 800, 900 and 1,000 nm. The microprocessor 41 is programmed to compare the three areas as detected. If they are roughly equal, the object can be sorted as a roughly cubic or spherical object. If the areas are very unequal, the object can be sorted as a flat.

If desired, the microprocessor 41 can also provide a rough sort according to the size of the object, as determined from the value of the presented area along the orthogonal axes, for instance by summating the three areas or by selecting the maximum or minimum size presented i.e. one of the following, where A, B and C are the three presented areas:

(a)

$$\frac{A+B+C}{3}$$

(b) Maximum of A, B and C.

(c) Minimum of A, B and C.

The apparatus shown is primarily for sorting for clarity, and is more complicated than it need be for the present invention. For instance, the integrating spheres 17 could be completely omitted.

Though diamonds are referred to above, and one use of the invention is for sorting diamonds and boart, the invention is also applicable for instance to sorting foodstuffs to reject foreign matter-such foodstuffs could be natural products such as peas or beans, or manufactured items such as sweets.

The invention can be used for providing a physical sort, i.e. separating out at least one category of the objects. However, more generally, the sort can merely be a classification-for instance an indication could be given of the number of flats in a parcel of the objects, without picking out the flats.

The present invention has been described above purely by way of example, and modifications can be made within the spirit of the invention.

We claim:

1. A method of making a rough classification of objects according to shape, comprising:

passing the objects in succession through a viewing zone;

in the viewing zone, viewing each object with at least three viewers which view along angularly spaced axes and thereby sensing respective areas presented to said viewers whereby said viewers give signals representative of said respective presented areas; and comparing said signals from each respective viewer to make a rough determination of the shape of the object.

2. The method of claim 1, wherein there are three said axes, in mutual orthogonal arrangement.

3. The method of claim 1, wherein the respective radiation is projected towards the viewer, and is interrupted in part by the object.

4. The method of claim 1, wherein said radiation is near infra-red.

5. The method of claim 1 wherein cross-talk between the areas sensed by the viewers is substantially prevented by using radiation of a different wave-length for each viewer.

6. The method of claim 1, wherein cross-talk between the areas sensed by the viewers is substantially prevented by viewing with each viewer in succession.

7. The method of claim 1, wherein a rough determination of the size of the object is also made.

8. A method of making a rough classification of objects according to size, comprising:

passing the objects in free flight in succession through a viewing zone;

in the viewing zone, viewing each object with three viewers which view along mutually orthogonal axes and thereby sensing respective areas presented to said viewers whereby said viewers give signals representative of said respective presented areas; and selecting said signal representing the largest presented area of said respective presented areas sensed.

9. A method of making a rough classification of objects according to size, comprising:

passing the objects in free flight in succession through a viewing zone;

in the viewing zone, viewing each object with three viewers which view along mutually orthogonal axes and thereby sensing respective areas presented to said viewers whereby said viewers give signals representative of said respective presented areas; and selecting said signal representing the smallest presented area of said respective presented areas sensed.

* * * * *